US 008214332B2

(12) United States Patent
Anglin et al.

(10) Patent No.: US 8,214,332 B2
(45) Date of Patent: Jul. 3, 2012

(54) DATA RETENTION USING LOGICAL OBJECTS

(75) Inventors: Matthew J. Anglin, Tucson, AZ (US); Avishai H. Hochberg, San Jose, CA (US); Toby L. Marek, San Jose, CA (US); James P. Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 12/480,549

(22) Filed: Jun. 8, 2009

(65) Prior Publication Data
US 2010/0312751 A1 Dec. 9, 2010

(51) Int. Cl.
*G06F 17/30* (2006.01)
(52) U.S. Cl. .......................................................... 707/644
(58) Field of Classification Search .................... 707/644
See application file for complete search history.

(56) References Cited

U.S. PATENT DOCUMENTS

| | | | |
|---|---|---|---|
| 7,165,154 B2 | 1/2007 | Coombs et al. | |
| 7,266,655 B1 | 9/2007 | Escabi, II et al. | |
| 2006/0026220 A1* | 2/2006 | Margolus | 707/204 |
| 2007/0088973 A1 | 4/2007 | Passerini et al. | |
| 2007/0130232 A1* | 6/2007 | Therrien et al. | 707/204 |
| 2008/0243946 A1 | 10/2008 | Deguchi et al. | |

OTHER PUBLICATIONS

Teruyuki Goto, "Disaster Recovery Feature of Symfoware DBMS," Fujitsu Sci. TEch. J., 43,3, pp. 301-314, Jul. 2007, http://www.fujitsu.com/downloads/MAG/vol43-3/paper08.pdf.
"The Business Continuity Advanced Pack for Heterogeneous UNIX, Windows, Linux and NetWare Systems," Arrow Enterprise Computing Solutions, Solutions Sheet, Aug. 2007, http://www.commvault.com/pdf/ArrowECS_SolutionSheet_BusinessContinuityAdvPack.pdf.
Imming, "Symantec Backup Exec™ 11d for Windows® Servers Sets the Standard for Exchange 2007 Server Data Protection," Symantec Corporation, pp. 1-26, Apr. 16, 2007, http://www.waltersoftware.com/shop/bews11_exchange07.pdf.
Wartell, "Backup Method—Virtual Full Backup," R1Soft Beta, Technical Paper, last edited on Sep. 25, 2008, http://wiki.r1soft.com/display/TP/Backup+Method+-+Virtual+Full+Backup.
"HP Data Protector 6.0 Software Object Consolidation," White Paper, Hewlett-Packard Development Company, L.P., pp. 1-76, Mar. 2008.

* cited by examiner

*Primary Examiner* — Khanh Pham
*Assistant Examiner* — Alexander Khong
(74) *Attorney, Agent, or Firm* — Griffiths & Seaton PLLC

(57) ABSTRACT

Various embodiments are provided for facilitation of data retention using logical objects. Following an operation creating a redundant copy of the data performed on a scheduled interval, a logical object containing a number of managed file versions, represented by a number of member objects for a recovery point, is created. The logical object is assigned a policy of a data retention policy construct associated with the recovery point. The logical object is adapted for reassignment between policies of the data retention policy construct associated with various recovery points. During the reassignment, the plurality of member objects representing the plurality of managed file versions are logically retained instead of performing a data copy operation to associate the plurality of managed file versions with another recovery point.

19 Claims, 4 Drawing Sheets

DATA RETENTION USING LOGICAL OBJECTS

BACKGROUND OF THE INVENTION

1. Field of the Invention

The present invention relates in general to data storage systems, and more particularly to apparatus, method and computer program product embodiments for facilitating data retention without requiring additional backup or data movement operations.

2. Description of the Related Art

Data backups are mechanisms well known in the industry that are used to allow users to restore their data due to failure of a component, human error, software corruption, or some other type of disaster. Data backup and archive procedures are implemented to solve two basic problems—data protection against hardware, software and human failure and data retention for reference or audit purposes. The former type of protection is typically short term, i.e., data is retained so that a file or system can be recovered to a point-in-time to some point within the recent past, usually within some number of weeks. The latter is usually long term, e.g., data has to be retained and remain accessible for several years. A data protection model might be retention of daily backups for two weeks (i.e., 12 copies of data representing each work day and one weekend for two weeks), an additional set of backups made on the weekends to be retained for a period of two months (beyond the daily backups), and finally a set of backups made at the end of each month to be retained for long term archival for several years (beyond the weekly backups).

SUMMARY OF THE INVENTION

Various embodiments are provided for facilitation of data retention without requiring additional backup or data movement. In one embodiment, by way of example only, a method for archiving data by a processor device applying a data retention policy construct is provided. Following an operation creating a redundant copy of the data performed on a scheduled interval, a logical object containing a number of managed file versions, represented by a number of member objects for a recovery point, is created. The logical object is assigned a policy of a data retention policy construct associated with the recovery point. The logical object is adapted for reassignment between policies of the data retention policy construct associated with various recovery points. During the reassignment, the plurality of member objects representing the plurality of managed file versions are logically retained instead of performing a data copy operation to associate the plurality of managed file versions with another recovery point. Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Typically, the creation of archive data requires additional backup operations and/or data movement. Several known backup mechanisms present this disadvantage, including grandfather-father-son (GFS) backups (requiring a full backup every week), progressive incremental backups (requiring maintenance of all incremental data up to six months), backup sets (requiring duplication at time of generation), and synthetic backup mechanisms (requiring retention of full and incremental backup information).

The illustrated embodiments present mechanisms for facilitating data retention, such as rapidly creating archive data, without the requirement of additional backup operations and/or data movement. These mechanisms retain archive information but without incurring the cost of creating and/or maintaining additional copies of data. In one data retention scenario, progressive incremental backup mechanisms achieve full backup redundancy by effectively taking only one full backup (the first backup operation), and forever after taking incremental backups relative to the last incremental backups. In this embodiment, progressive incremental backup mechanisms are exploited to reduce the amount of redundancy in daily backups and achieve long term recovery points without maintaining intermediate version storage, and without requiring additional data copy operations.

The mechanisms of the present invention leverage a so-called "logical object" as a container to retain member objects representative of managed file versions for a certain recovery point. These logical objects may be manipulated according to data retention policies assigned to them, rather than by resorting to data movement in and of itself. Accordingly, as certain data retention events take place, such as the occurrence of data retention operations during a predefined interval, the logical objects may be reassigned to differing policies associated with differing recovery points. In some cases, the reassignment increases the length of time in which the managed file versions associated with member objects of a particular logical object are retained. In other cases, the reassignment expires the member objects, and thereby, the managed file versions, from the data repository. In this way, management of the various recovery points in a data retention policy construct may be managed by management of the policies assigned to various logical objects without the additional requirement of data movement or other data operations. This management will be illustrated in one exemplary embodiment, following, implementing a progressive backup scheme according to regular backup intervals. The skilled artisan will, however, realize that the mechanisms of the present invention may be applied to a variety of data retention schemes using various policies associated with rotational frequencies.

Figure 1:
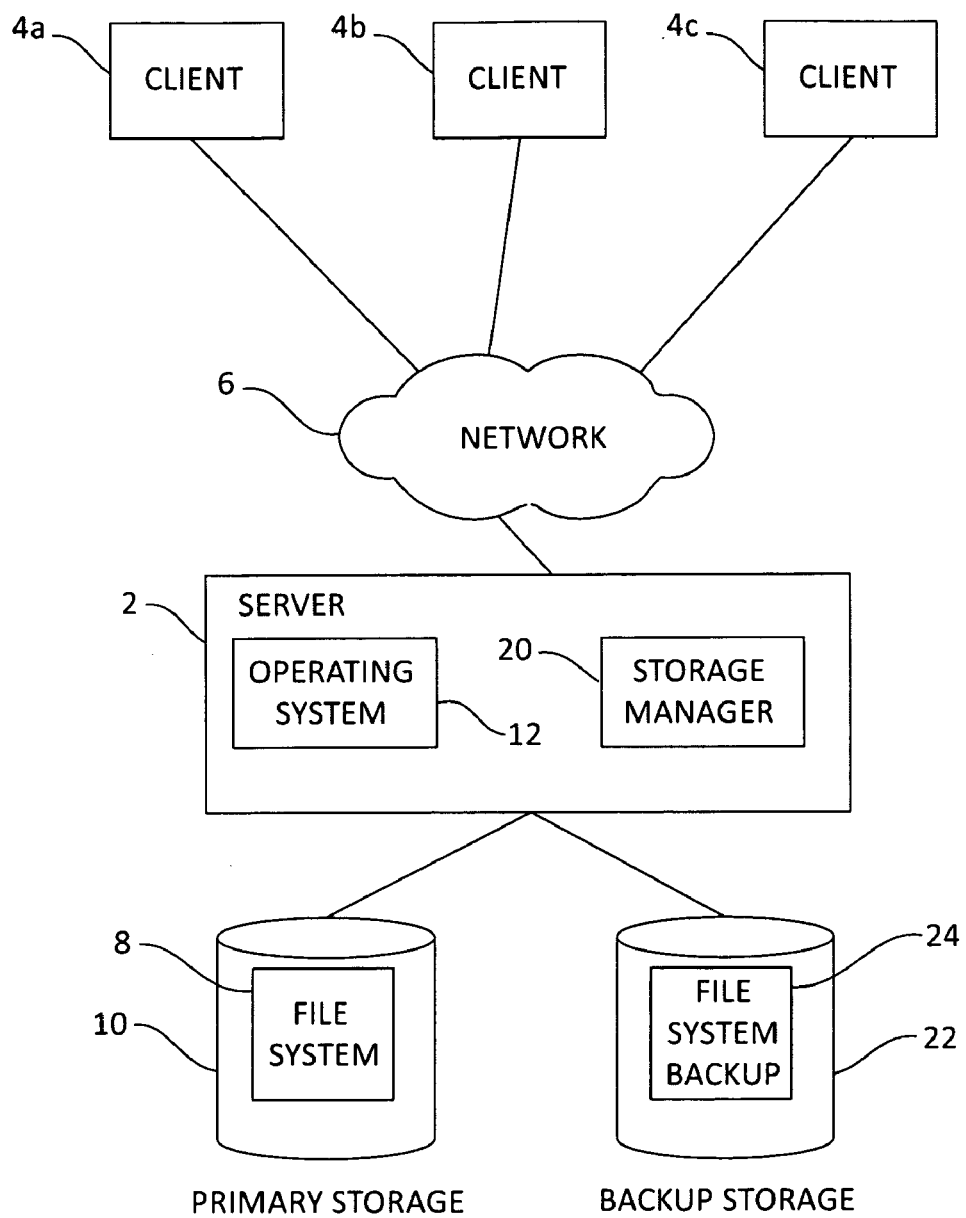
FIG. 1 is a block diagram of an exemplary computing environment in which aspects of the present invention may be realized.

Referring to FIG. 1, an exemplary computing environment is depicted in which the described embodiments may be realized. A server 2 is in communication with multiple client computers 4a, b, c over a network 6. The network 6 may comprise any network known in the art, such as the Internet, an Intranet, a Fibre Channel network, Storage Area Network (SAN), Local Area Network (LAN), etc. The multiple client computers 4a, b, c maintain a file system 8 in a primary storage system 10, which may comprise any storage system known in the art, such as a one or more hard disk drives, a Direct Access Storage Device (DASD), Just a Bunch of Disks (JBOD), a Redundant Array of Independent Disks (RAID), tape library, optical library, etc. The server 2 includes an operating system 12 which may comprise any server-oriented operating system known in the art, such as IBM® z/OS®, AIX®, Microsoft® Windows®, etc. The server 2 may comprise one or more server class computers. The clients 4a, b, c may comprise any computing device known in the art, such as a server class machine, a mainframe, desktop computer, laptop computer, hand held computer, telephony device, etc.

The server 2 further includes a storage manager 20 that maintains a backup copy of the file system 24, including applications and/or data, in a backup storage 22. The storage manager may include a data retention manager/data retention program (described in further detail in FIGS. 2A, 2B, following), which may include the functionality of any backup manager known in the art, such as the IBM® Tivoli® Storage Manager program, in addition to the functionality of the described implementations. The backup storage 24 may comprise any suitable secondary storage device for maintaining a backup copy of data, such as a tape storage system comprised of one or more tape drives and tape cartridges, an optical disk library, etc. The server 2 may communicate with the backup storage 22 via any interface known in the art, such as a backplane interface in the server 2, parallel ports, serial ports, a Small Computer System Interface (SCSI), a Fibre Channel arbitrated loop, a network, or any other interface known in the art.

The skilled artisan will appreciate that server 2 may contain various components in addition to the operating system 12 and storage manager 20 which are not shown for purposes of convenience, such as a processor(s), memory devices, adapters, and the like. For example, the storage manager 20 may operate, at least in part, as one or more processors executing the operating system 12.

Figure 2A:
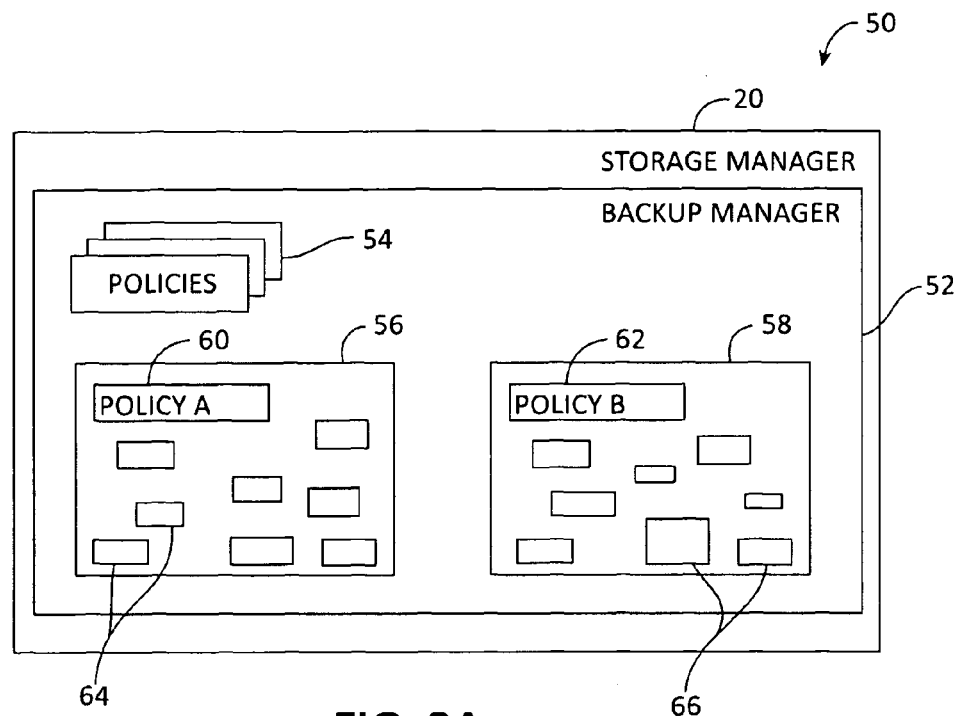
FIG. 2A is a block diagram of an exemplary storage manager including at least two logical objects.

Turning to FIG. 2A, an exemplary block diagram of the functionality 50 of storage manager 20 is depicted. Storage manager 20 includes data retention manager 52 for implementing data retention mechanisms according to a policy construct. Data retention manager 52 includes a number of policies 54. Each of the policies 54 of the data retention manager 52 is adapted to be applied according to a portion of the policy construct. For example, one policy 54 may be designed to retain data based on a daily rotation, while another policy may be designed to retain data based on a weekly or monthly rotation.

In the depicted embodiment, a logical object 56 is created as a container object for a number of member objects 64 representing managed file versions at a certain recovery point. Similarly, logical object 58 is created as a container object for a number of member objects 66 representing managed file versions at an additional recovery point. Logical objects 56 and 58 function as container objects by logically holding the number of member objects 64. Member objects 64 are logical members of the logical objects 56 and 58 to which the member objects 64 are assigned. Member objects 64 are logical entities that represent, or "map to," a wide variety of types of computer files, or blocks of arbitrary information as of a certain recovery point, such as a specific date. For example, one member object 64 may be a logical object that represents a block of database information that is current as of Jan. 1, 2009. Another member object 64 may be a logical object that represents text characters in a word processing document that is current as of Feb. 1, 2009.

The skilled artisan will appreciate that a large amount of member objects 64 may exist for a certain recovery point. Each of the member objects 66 represent and/or are mapped to managed file versions. In other words, the member objects 66 represent file versions that are managed by entities such as a backup manager. While the specific functionality of the backup manager is further described, following, the backup manager may perform such actions relating to the management of each of the file versions. For example, an older version of a particular file may be expired, or deleted from memory. A newer version of a particular file may be retained.

It should be noted that member objects 64 and 66 may belong to more than one container object. The functionality of logical objects will be further described, following. The logical object 56 is assigned a policy 60, and logical object 58 is assigned policy 62. In one embodiment, policy 60 may be a weekly rotation retention policy, while policy 62 may be an additional weekly rotation retention policy.

In one embodiment, FIG. 2A represents a snapshot of the data retention manager 52 at a period of time. As will be further described, following, at a conclusion of a regularly scheduled backup interval in which a progressive incremental backup operation is performed, the backup manager 52 may create the logical object 56 for a particular recovery point. The data retention manager queries the inventory for all managed file versions for the recovery point it is representing. Each of the managed file versions is represented by a member object, which is then assigned into the logical object 56. A number of member objects 64 are assigned into the logical object 56 in this way.

A policy 60 assigned by an administrator may be assigned to the logical object 56. In one embodiment, the policy 60 may be similar to the daily policy interval performed under a progressive backup scheme, but with an accompanying duration (e.g., 14 days). Creation of the logical object 56 and assignment of member objects 64 may proceed in an asynchronous manner. In other words, the creation and assignment need not occur immediately following the progressive incremental backup operation, but in one embodiment, preferably before the next scheduled backup is to occur.

In similar fashion to the creation and assignment of logical object 56 and member objects 64, the logical object 58 may be created following the progressive incremental backup operation of the next scheduled interval (e.g., next day). Here again, the member objects 66 representing all managed file versions for the next interval's recovery point are incorporated, and logical object 58 is assigned an additional daily-type policy 62 with an accompanying time duration (again, e.g., two weeks).

Figure 2B:
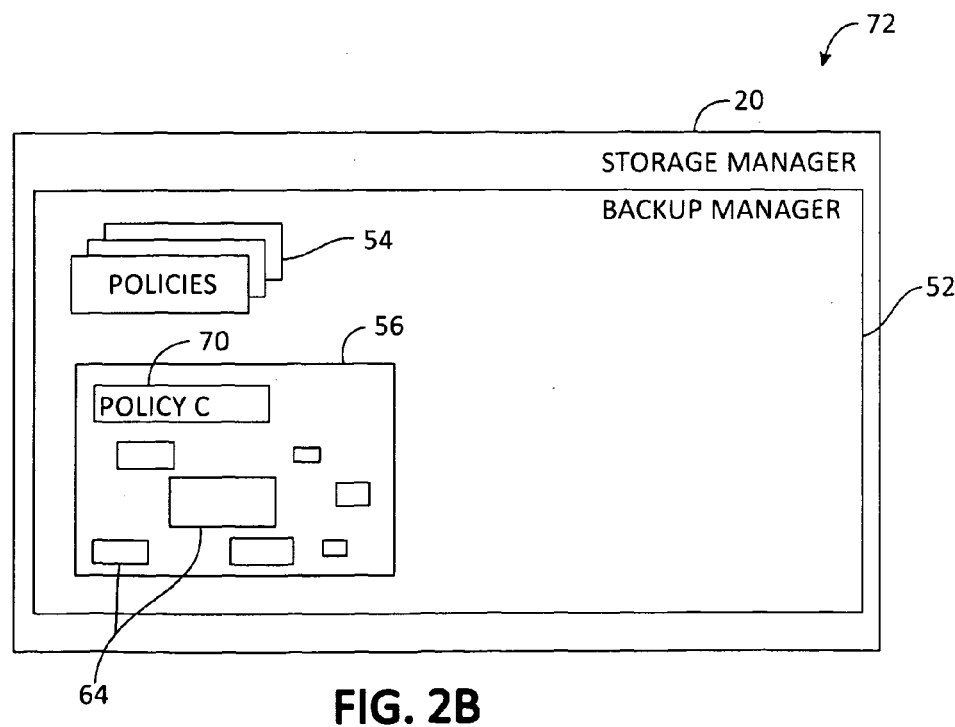
FIG. 2B is a block diagram of an additional exemplary storage manager including at least one logical object.

Referring now to FIG. 2B, an additional functionality 72 of storage manager 20 and backup manager 52 is depicted. At the conclusion of the duration of time of the policy 60 (FIG. 2A), and before the creation of an additional logical object to be assigned an additional daily-type policy, the logical object 56 is reassigned/graduated to a policy 70 representative of a lengthier retention (e.g., weekly instead of daily) and for a lengthier duration of time (e.g., eight weeks). This will ensure that the logical object 56, and member objects 64 corresponding to managed file versions in the repository will be retained beyond the original duration of the daily-type policy 60. The logical object 56 and member objects are logically retained 64. In other words, no additional backup operation or data movement must take place.

In accordance with policy 62, once the logical object 56 is graduated to a new policy, the logical object 58 and corresponding member objects 66 may then be expired from the repository. In this way, each of the logical objects is logically reassigned or expired per operation of policy, and are managed accordingly. At a point in the future, the logical object 56 may be reassigned again to an additional policy (e.g., monthly) with an accompanying lengthier duration of time. This scenario will be further described, following.

Management of logical objects by reassignment/graduation and expiration by operation of policy is one aspect of the present invention and following claimed subject matter. By management of the logical objects themselves, no additional data retention operations or data movement need take place. The file versions represented by the member objects are managed through the management of the corresponding logical objects to which they are assigned.

Figure 3:
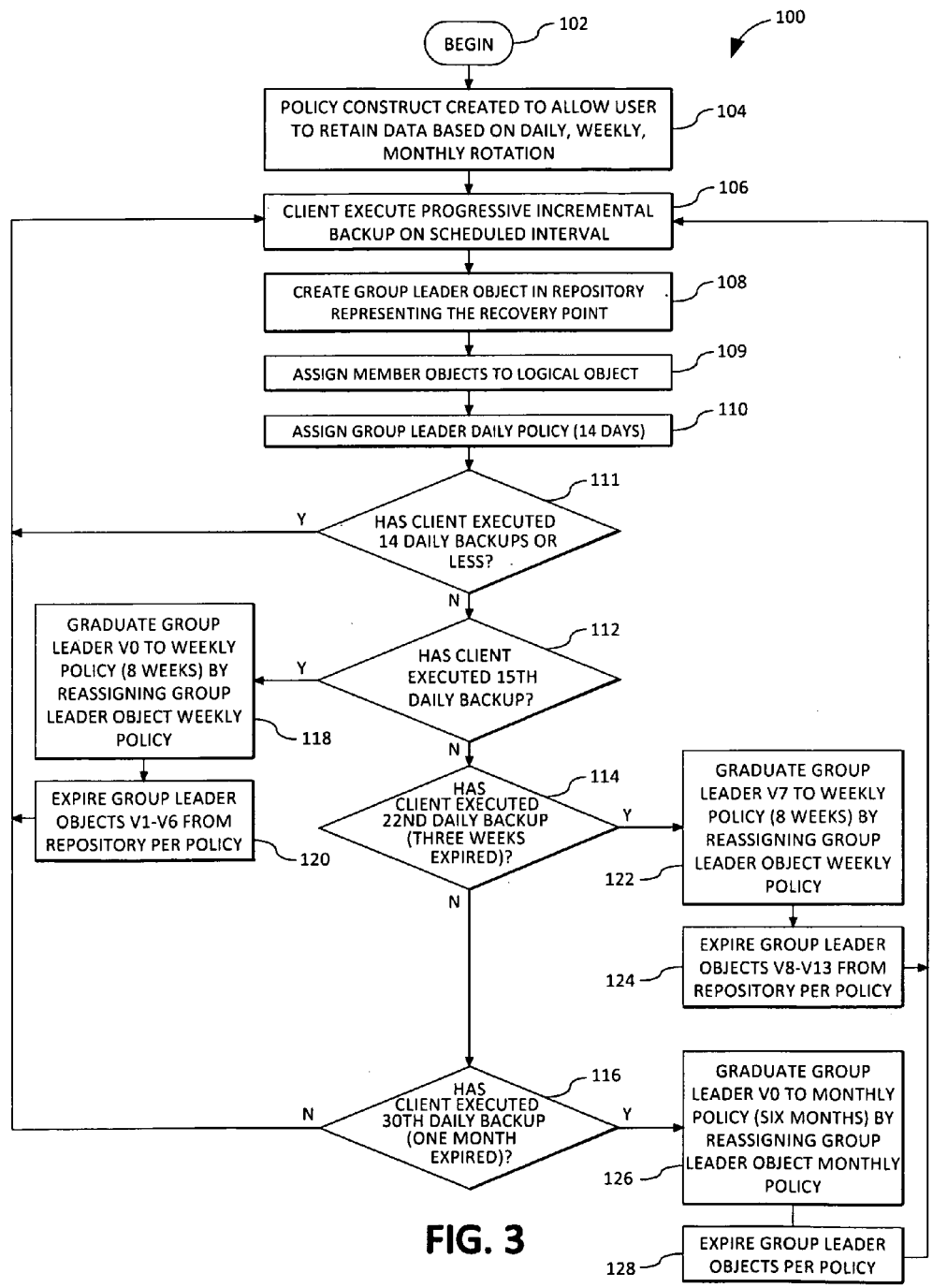
FIG. 3 is a flow chart diagram of an exemplary method for facilitating data retention using logical objects.

Turning to FIG. 3, a method 100 for rapidly creating archive data using aspects of the present invention as previously described is illustrated. As one skilled in the art will appreciate, various steps in the method 100 may be implemented in differing ways to suit a particular application. In addition, the described method 100 may be implemented by various means, such as hardware, software, firmware, or a combination thereof operational on or otherwise associated with the storage environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. While the method 100 is applicable to computer environments employing agents for data discovery and data movement, and including a server for data storage and cataloging, the skilled artisan will appreciate that the method 100 may be generalized to any network-based storage management mechanism.

Method 100 begins (step 102) with the creation of a new policy construct allowing an administrator/user to retain data on a certain schedule (step 104). For purposes of the illustrated embodiment, this schedule will take the form of a daily, weekly, and monthly retention rotation schedule (DWM schedule). As a following step, a client (agent) performs an operation to retain data following a predetermined interval. In the illustrated embodiment, this operation involves executing a progressive incremental back operation on a scheduled interval of one day (daily backup) (step 106), although the skilled artisan will appreciate that additional data retention operations are contemplated.

At the conclusion of the progressive incremental backup, the backup manager creates an object in the repository representing the recovery point (step 108). This object is a logical object. The backup manager queries the inventory for all managed file versions for the recovery point it is representing, and all of the managed file versions, represented by member objects, are assigned into the logical object (step 109). For example, the server might determine that there are 10,000 objects in the current repository that represent the desired recovery point. A single logical object is created and the 10,000 member objects are assigned as members of the logical object. Again, as described previously, any member object may belong to a previous group leader in a particular data retention scheme. The logical object is assigned a policy that allows retention similar to the "daily" provisions specified by the administrator, in this case, 14 days (step 110). Again, note that logical object creation and member assignment can be asynchronous in nature.

Following step 110, unless policy otherwise dictates, method 100 returns to steps 106 to execute an additional progressive incremental backup on the scheduled interval (e.g., an additional daily backup operation). This process continues for two weeks, as decision 111 queries whether the client has executed 14 daily backups or less. If so, the method 100 returns to step 106 to execute the additional backup. After two weeks have elapsed, there are 14 logical objects representing the 14 daily backups, which may be referred to as d0-d13 (daily backups oldest to newest). The agent executes the 15th daily backup (d14) (step 112).

Before the creating of the logical object representing d14, the data retention manager reassigns (graduates) the logical object d0 to the policy representing the "weekly" construct by the administrator, in this case, 8 weeks (step 118). Accordingly, logical object d0 is reassigned to the weekly policy as logical object w0. This will ensure that logical object d0 is maintained beyond the 14 days of its current policy (again as w0). After the 15 th daily backup (d14) and subsequent backups for the week are created, logical object w0 is protected by the new policy but the logical objects d1-d6 and their corresponding member data (i.e., member objects and associated data) can be expired from the inventory as their policy dictates (step 120). Method 100 then returns to step 106 to perform additional progressive incremental backup operations on the scheduled interval, and additional logical objects are created and member objects assigned accordingly.

After three weeks have elapsed, logical objects w0 and d7-d20 are maintained by the server. When the client executes the $22^{nd}$ daily backup, and according to decision 114, a similar scenario is carried out as before, where logical object d7 is graduated to the weekly policy (step 122) to become logical object w1 and logical objects d8-d13 are expired off as the new backups (d21-d27) are created (step 124). Method 100 returns to step 106 and continues as before.

After one month has elapsed, the server maintains logical objects w0, w1, and d14-d27. The server graduates w0 to the policy representing the "monthly" construct, in this case 6 months (step 126) as logical object m0, and expires relevant logical objects per policy (e.g., logical objects w1, and d14-d27) (step 128). Method 100 then returns again to step 106 and continues as before.

While not shown, the skilled artisan will appreciate that at some point in the future, various logical objects may continue to be reassigned as other logical objects are expired per operation of policy. This process continues as before, as new logical objects are reassigned, and others are expired from the repository. To accurately maintain the DWM schedule, the server may maintain graduation heuristics that dictate which daily versions graduate to weekly versions, and which weekly versions graduate to monthly versions. These graduation heuristics will vary according to a particular implementation of policy. The skilled artisan will appreciate that while the illustrated embodiment represents an example of a daily/weekly/monthly data retention model, the time intervals specified may be arbitrary and may map to a variety of other models of rotation. Each reassignment decision, and accordingly, management of various recovery points associated with particular logical objects, may be directed according to the operation of the policies to which the logical objects are assigned.

Figure 4:
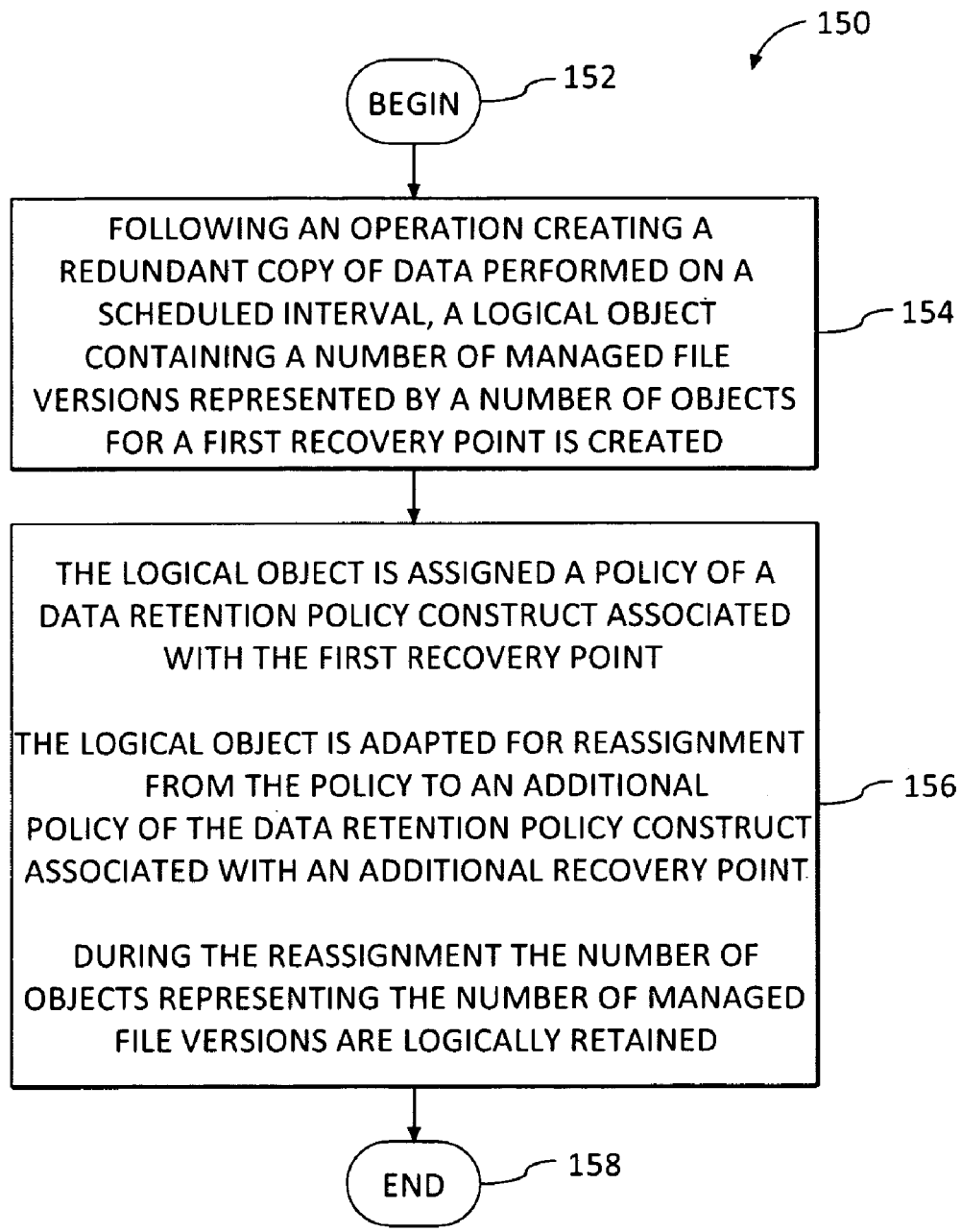
FIG. 4 is a flow chart diagram of an exemplary method for facilitating data retention incorporating logical objects embodied a computer program product.

FIG. 4, following, is a flow chart diagram of a method 150 depicting exemplary computer program product-implemented steps for carrying out various aspects of the present invention. Method 150 begins (step 152) following an operation creating a redundant copy of the data performed on a scheduled interval. A first executable portion creates logical object containing a plurality of managed file versions represented by a plurality of member objects for a first recovery point (step 154). A second executable portion then assigns the logical object a first policy of the data retention policy construct associated with the first recovery point (step 156). The logical object is adapted for reassignment from the first policy to a second policy of the data retention policy construct associated with a second recovery point. During the reassignment the plurality of member objects representing the plurality of managed file versions are logically retained instead of performing a data copy operation to associate the plurality of managed file versions with the second recovery point. Here again, logical retention (or expiration) of the plurality of member objects is performed rather than data movement of additional data retention operations on the managed file versions represented by the member objects, according to operation of policy, to manage the various recovery points.

By implementation of various aspects shown in the illustrated embodiments, management of logical objects provides for creation of archive data without encumbering additional resources such as requiring additional data movement or data retention operations such as backup operations. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for retaining data by a processor device applying a data retention policy construct in a data storage system, comprising:
    following an operation creating a redundant copy of the data performed on a scheduled interval, creating a logical object containing a plurality of managed file versions represented by first a plurality of member objects each generated on a first periodic basis for a first predetermined amount of time;
    assigning the logical object a first data retention policy, wherein the first plurality of member objects are adapted for reassignment from the first data retention policy to a second data retention policy to generate a second plurality of member objects on a second periodic basis for a second predetermined amount of time at an incremental expiration of the first periodic basis for the first predetermined amount of time; and
    reassigning the logical object from the first data retention policy to the second data retention policy, wherein each of the first plurality of member objects are reassigned from the first data retention policy to the second data retention policy at each incremental expiration of the first predetermined amount of time for each respective member object in the first plurality of member objects,
    wherein during said reassignment of the logical object, the second plurality of member objects are logically retained in the logical object instead of performing a data copy operation on the second plurality of member objects.

2. The method of claim 1, wherein the logical object is further adapted for additional reassignment from the second data retention policy to a third data retention policy to generate a third plurality of member objects on a third periodic basis for a third predetermined amount of time at an incremental expiration of the second periodic basis for the second predetermined amount of time.

3. The method of claim 1, wherein the first data retention policy establishes a first predetermined time for which the logical object retains the plurality of member objects, and the second data retention policy establishes a second predetermined time for which the logical object retains the plurality of member objects, further wherein the second predetermined time is longer than the first predetermined time, and the reassignment from the first data retention policy to the second data retention policy occurs following the incremental expiration of the first predetermined time.

4. The method of claim 1, further including managing the first predetermined amount of time, the second predetermined amount of time and additional predetermined amounts of time by managing assignments of the logical object between a plurality of data retention policies associated with the predetermined amount of time, the second predetermined amount of time, and the additional predetermined amounts of time.

5. The method of claim 1, wherein the operation creating the redundant copy of the data includes a progressive incremental backup operation performed on a scheduled interval.

6. The method of claim 1, wherein creating the logical object containing the plurality of managed file versions represented by the plurality of member objects for the first predetermined amount of time is performed asynchronously with the operation creating the redundant copy of the data.

7. A system for retaining data, comprising:
    a processor device applying a data retention policy construct as part of a storage management scheme in a data storage system, wherein the processor device is adapted for:
        following an operation creating a redundant copy of the data performed on a scheduled interval, creating a logical object containing a plurality of managed file versions represented by a first plurality of member objects each generated on a first periodic basis for a first predetermined amount of time;
        assigning the logical object a first data retention policy, wherein the first plurality of member objects are adapted for reassignment from the first data retention policy to a second data retention policy to generate a second plurality of member objects on a second periodic basis for a second predetermined amount of time at an incremental expiration of the first periodic basis for the first predetermined amount of time; and
        reassigning the logical object from the first data retention policy to the second data retention policy, wherein each of the first plurality of member objects are reassigned from the first data retention policy to the second data retention policy at each incremental expiration of the first predetermined amount of time for each respective member object in the first plurality of member objects,
            wherein during said reassignment of the logical object, the second plurality of member object are logically retained in the logical object instead of performing a data copy operation on the second plurality of member objects.

8. The system of claim 7, wherein the logical object is further adapted for additional reassignment from the second data retention policy to a third data retention policy to generate a third plurality of member objects on a third periodic basis for a third predetermined amount of time at an incremental expiration of the second periodic basis for the second predetermined amount of time.

9. The system of claim 7, wherein the first data retention policy establishes a first predetermined time for which the logical object retains the plurality of member objects, and the second data retention policy establishes a second predetermined time for which the logical object retains the plurality of member objects, further wherein the second predetermined time is longer than the first predetermined time, and the reassignment from the first data retention policy to the second data retention policy occurs following the incremental expiration of the first predetermined time.

10. The system of claim 7, wherein the processor device is further adapted for managing the first predetermined amount of time, the second predetermined amount of time and additional predetermined amounts of time by managing assignments of the logical object between a plurality of data retention policies associated with the first predetermined amount of time, the second predetermined amount of time, and the additional predetermined amounts of time.

11. The system of claim 7, wherein the operation creating the redundant copy of the data includes a progressive incremental backup operation performed on a scheduled interval.

12. The system of claim 7, wherein the processor device is further adapted for, during the creating the logical object containing the plurality of managed file versions represented by the plurality of member objects for the first predetermined amount of time, performed the creating the logical object asynchronously with the operation creating the redundant copy of the data.

13. The system of claim 9, wherein the first predetermined amount of time is approximately 14 days in length, and the second predetermined amount of time is approximately eight weeks in length.

14. A computer program product for archiving data by a processor device applying a data retention policy construct, the computer program product comprising a computer-readable storage medium having computer-readable program code portions stored therein, the computer-readable program code portions comprising:
    a first executable portion for, following an operation creating a redundant copy of the data performed on a scheduled interval, creating a logical object containing a plurality of managed file versions represented by a first plurality of member objects each generated on a first periodic basis for a first predetermined amount of time;
    a second executable portion for assigning the logical object a first data retention policy, wherein the first plurality of member objects are adapted for reassignment from the first data retention policy to a second data retention policy to generate a second plurality of member objects on a second periodic basis for a second predetermined amount of time at an incremental expiration of the first periodic basis for the first predetermined amount of time; and
    a third executable portion for reassigning the logical object from the first data retention policy to the second data retention policy, wherein each of the first plurality of member objects are reassigned from the first data retention policy to the second data retention policy at each incremental expiration of the first predetermined amount of time for each respective member object in the first plurality of member objects,
    wherein during said reassignment of the logical object, the second plurality of member objects are logically retained in the logical object instead of performing a data copy operation on the second plurality of member objects.

15. The computer program product of claim 14, wherein the logical object is further adapted for additional reassignment from the second data retention policy to a third data retention policy to generate a third plurality of member objects on a third periodic basis for a third predetermined amount of time at an incremental expiration of the second periodic basis for the second predetermined amount of time.

16. The computer program product of claim 14, wherein the first data retention policy establishes a first predetermined time for which the logical object retains the plurality of member objects, and the second data retention policy establishes a second predetermined time for which the logical object retains the plurality of member objects, further wherein the second predetermined time is longer than the first predetermined time, and the reassignment from the first data retention policy to the second data retention policy occurs following the incremental expiration of the first predetermined time.

17. The computer program product of claim 14, further including a fourth executable portion for managing the first predetermined amount of time, the second predetermined amount of time and additional predetermined amounts of time by managing assignments of the logical object between a plurality of data retention policies associated with the first predetermined amount of time, the second predetermined amount of time, and the additional predetermined amounts of time.

18. The computer program product of claim 14, wherein the operation creating the redundant copy of the data includes a progressive incremental backup operation performed on a scheduled interval.

19. The computer program product of claim 14, wherein creating the logical object containing the plurality of managed file versions represented by the plurality of member objects for the first predetermined amount of time is performed asynchronously with the operation creating the redundant copy of the data.

\* \* \* \* \*